US008326459B2

(12) United States Patent  
Zaier

(10) Patent No.: US 8,326,459 B2  
(45) Date of Patent: Dec. 4, 2012

(54) ROBOT CONTROL APPARATUS, ROBOT CONTROL METHOD, AND COMPUTER READABLE RECORDING MEDIUM HAVING RECORDED THEREON A ROBOT CONTROL PROGRAM

(75) Inventor: Riadh Zaier, Al Khod (OM)

(73) Assignee: Fujitsu Limited, Kawasaki (JP)

( * ) Notice: Subject to any disclaimer, the term of this patent is extended or adjusted under 35 U.S.C. 154(b) by 750 days.

(21) Appl. No.: 12/560,057

(22) Filed: Sep. 15, 2009

(65) Prior Publication Data

US 2010/0070076 A1 Mar. 18, 2010

(30) Foreign Application Priority Data

Sep. 16, 2008 (JP) ................................ 2008-236611

(51) Int. Cl.  
*G06F 19/00* (2011.01)
(52) U.S. Cl. ............ 700/250; 700/245; 700/258; 901/1; 901/46; 318/568.12
(58) Field of Classification Search .................. 700/245, 700/250, 253, 254, 255, 256, 258; 901/1, 901/46, 48, 50; 318/568.12, 568.16, 568.22  
See application file for complete search history.

(56) References Cited

U.S. PATENT DOCUMENTS 6,999,851 B2 * 2/2006 Kato et al. .................... 700/245

7,482,775 B2    1/2009 Zaier
2005/0113973 A1    5/2005 Endo et al.
2007/0145930 A1*   6/2007 Zaier ........................ 318/568.12

FOREIGN PATENT DOCUMENTS

| JP | 2003089081 A | * | 3/2003 |
| JP | 2005-96068 | | 4/2005 |
| JP | 2007-175809 | | 7/2007 |
| JP | 2008-93757 | | 4/2008 |
| JP | 2008126382 A | * | 6/2008 |

OTHER PUBLICATIONS

Albiez et al., Reactive Reflex-Based Control for a Four-Legged Walking Machine, 2003, Robotics and Autonomous Systems 44, pp. 181-189.*

(Continued)

*Primary Examiner* — Khoi Tran  
*Assistant Examiner* — Spencer Patton  
(74) *Attorney, Agent, or Firm* — Fujitsu Patent Center

(57) ABSTRACT

A robot control apparatus includes walking operation control unit which controls the robot to carry out a predetermined walking operation; an obstacle detection unit which detects an obstacle existing in a place where a leg of the robot lands; a determination unit which determines whether or not a place on a sole of the robot's leg on which a reaction force from the obstacle works is in a stable area; and a reflex control unit which causes an ankle of the robot's leg in contact with the obstacle, when the reaction force working on the sole of the robot's leg is not in the stable area, to carry out a pitching or rolling operation, expanding the stable area, extends the leg, and controls the leg in such a way that a ZMP converges on a point of equilibrium of a support leg.

3 Claims, 20 Drawing Sheets

OTHER PUBLICATIONS

Riadh Zaier "Motion Generation of Humanoid Robot based on Polynomials Generated by Recurrent Neural Network", *Proceedings of the First Asia International Symposium on Mechatronics* (AISM 2004) Sep. 27-30, 2004, Xi'an, China Sep. 27, 2004, 659-664.

Riadh Zaier "Motion Pattern Generator and Reflex System for Humanoid Robots", *Proceedings of the 2006 IEEE/RSJ International Conference on Intelligent Robots and Systems* Oct. 9-15, 2006, Beijing, China Oct. 9, 2006, 840-845.

Riadh Zaier "Piecewise-Linear Pattern Generator and Reflex System for Humanoid Robots", *2007 IEEE International Conference on Robotics and Automation* Roma, Italy, Apr. 10-14, 2007 Apr. 10, 2007, 2188-2195.

Riadh Zaier "Experimental Study of Sensory Reflex for Humanoid Robots: Activation and Stability Issues", *25th Annual Conference of the Robotics Society of Japan*, 2007 Sep. 13, 2007, 3H16.

* cited by examiner

BASIC CONCEPT: INERTIAL CHANGE AT A MINIMUM

FIG. 13A
FIG. 13B
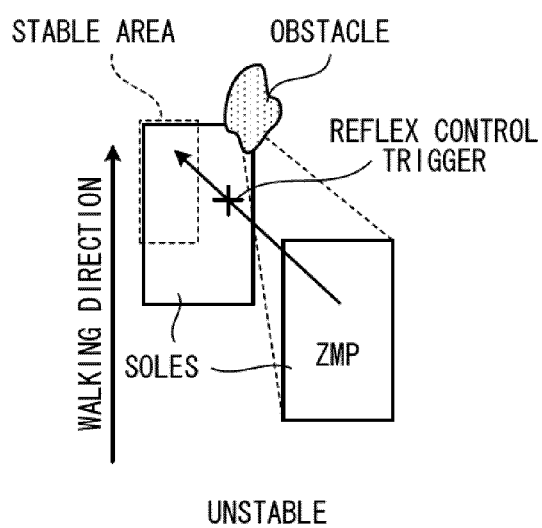
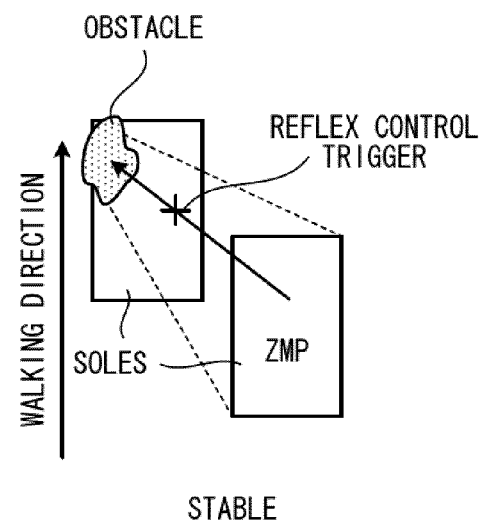

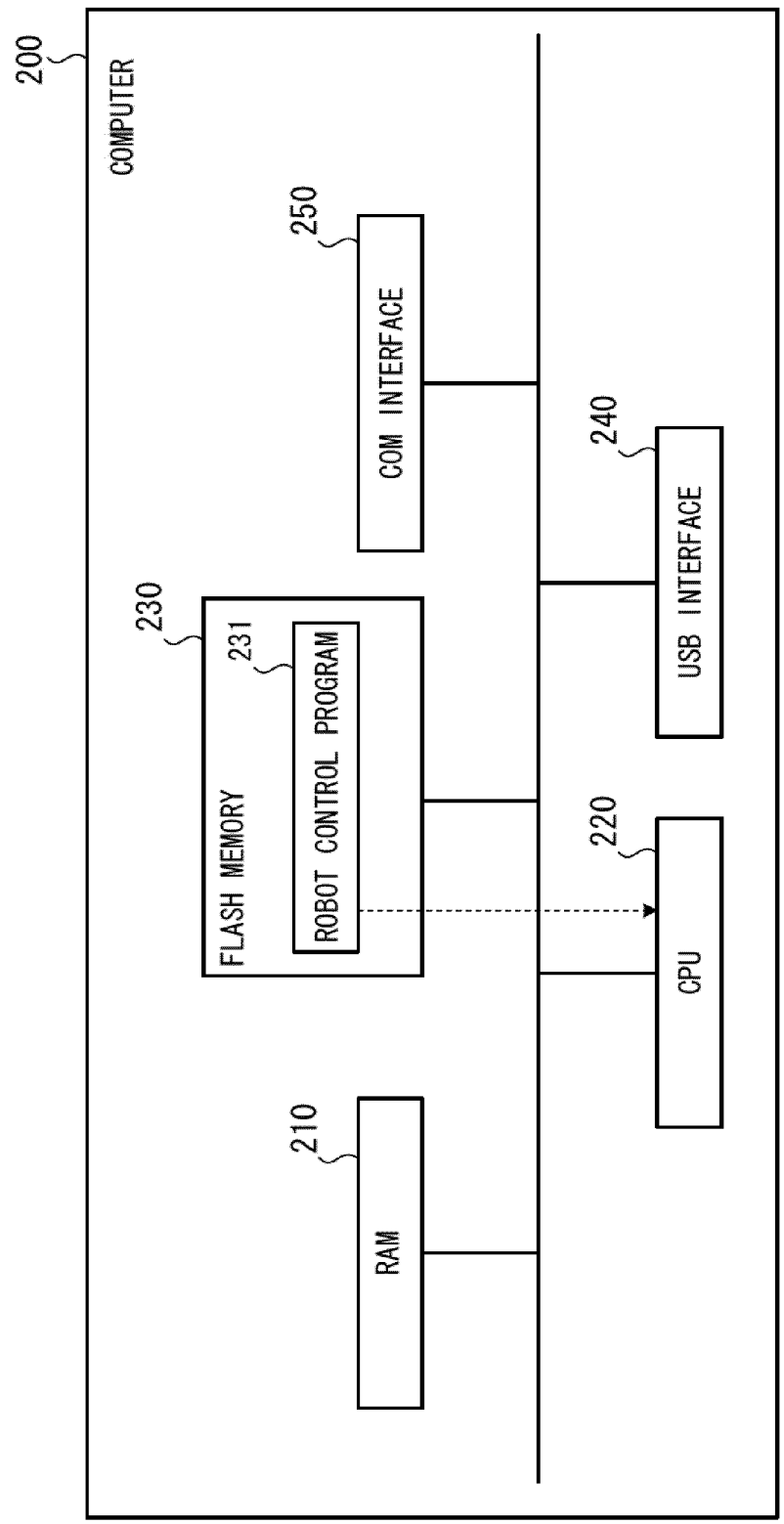

ROBOT CONTROL APPARATUS, ROBOT CONTROL METHOD, AND COMPUTER READABLE RECORDING MEDIUM HAVING RECORDED THEREON A ROBOT CONTROL PROGRAM

CROSS-REFERENCE TO RELATED APPLICATIONS

This application is based upon and claims the benefit of priority of the prior Japanese Patent Application No. 2008-236611, filed on Sep. 16, 2008, the entire contents of which are incorporated herein by reference.

FIELD

The embodiment discussed herein is related to a robot control apparatus, a robot control method, and computer readable recording medium having recorded thereon a robot control program.

BACKGROUND

The majority of research relating to the walk of a humanoid robot uses a zero moment point (ZMP) law. The ZMP law controls the ZMP in such a way as to keep the ZMP inside a support polygon. With this approach, the humanoid robot and the robot's ambient environment are accurately modeled, and a differential equation is solved. However, this modeling is difficult when there is an unknown factor. Furthermore, as it takes time to solve the differential equation, real time control is difficult.

As one approach, there is a method which does not use the ZMP law. For example, there is a heretofore known technology which, utilizing a cyclical movement of a movable portion of the robot, adjusts a phase of the cyclical movement so that a posture of the robot stabilizes (refer to JP-A-2005-96068). Herein, the movable portion is the robot's leg or arm.

Also, a technology which, while rendering unnecessary the modeling of the humanoid robot and the robot's ambient environment, efficiently controls movement in such a way that the humanoid robot can stably carry out a variety of movements is described in JP-A-2007-175809.

Also, a reflex control technology which, on detecting an obstacle existing at a point where a leg of the robot lands while the humanoid robot is walking, prevents the humanoid robot falling over, and returns the humanoid robot to a stable condition, is described in JP-A-2008-93757. With the reflex control described in JP-A-2008-93757, the humanoid robot is returned to the stable condition by an operation of rolling to a support leg, and returning a leg to the position before starting its swing.

SUMMARY

According to an aspect of an embodiment, a robot control apparatus includes a walking operation control unit which generates control information based on postures at a plurality of differing points, including reference postures in which a robot is standing unaided, and controls the robot so as to carry out a predetermined walking operation; an obstacle detection unit which detects an obstacle existing in a place where a leg of the robot lands; a determination unit which, upon the obstacle being detected, determines whether or not a place on a sole of the leg of the robot on which a reaction force from the obstacle works is in a stable area; and a reflex control unit which, in the event that it is determined that the reaction force does not work in the stable area, after causing an ankle of the leg of the robot in contact with the obstacle to carry out a pitching operation or rolling operation, expanding the stable area, extends the leg, and controls the leg in such a way that a ZMP converges on a point of equilibrium of a support leg.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 13A and 13B are diagrams illustrating a position of an obstacle and a condition of the robot;

FIG. 20 is a functional block diagram illustrating a configuration of a computer which executes a robot control program according to the embodiment.

DESCRIPTION OF EMBODIMENT

Hereafter, referring to the attached drawings, a detailed description will be given of a preferred embodiment of a robot control apparatus, a robot control method, and a robot control program according to the invention. Herein, a two-legged humanoid robot is given as an example of a robot, but it is also acceptable to apply the invention to another robot, such as a four-legged robot.

Figure 1:
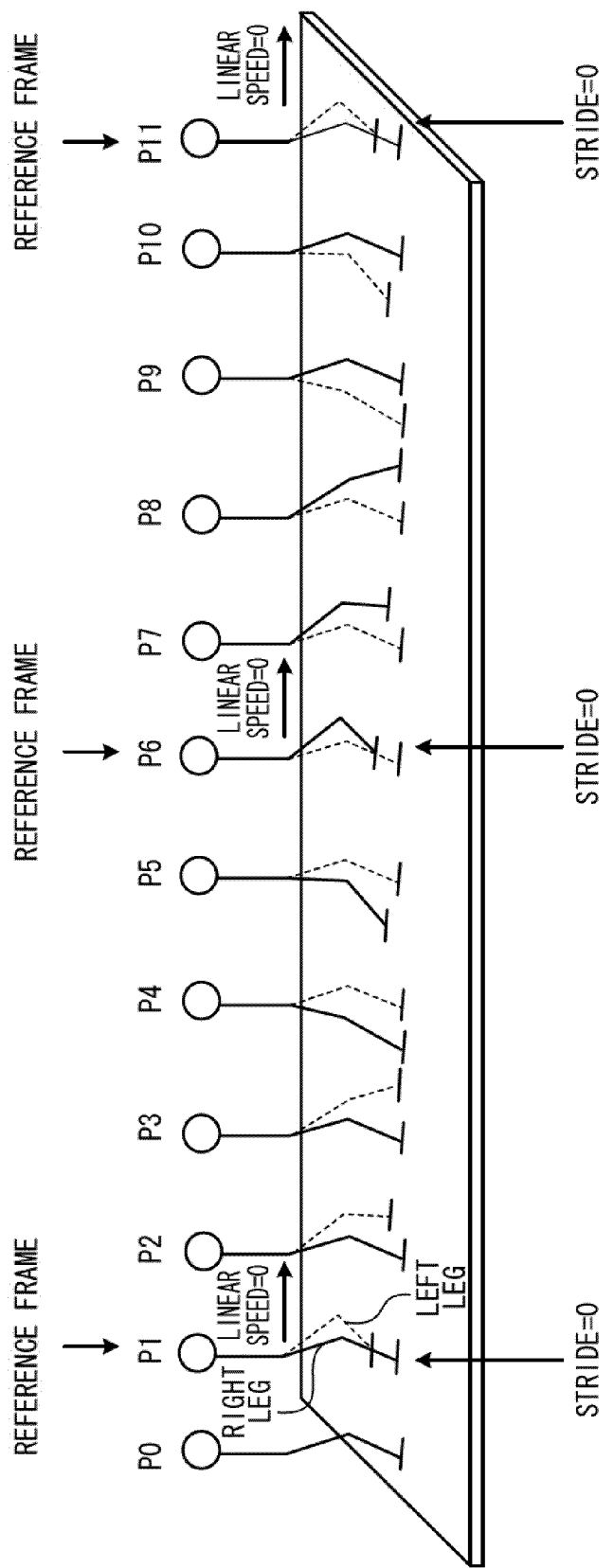
FIG. 1 is a diagram illustrating a robot walk according to an embodiment.

FIG. 1 is a diagram illustrating a robot walk according to the embodiment. Herein, the right leg of the robot is depicted by a solid line, and the left leg of the robot by a broken line. Herein, a plurality of frames Pi, which define various postures of the robot during a walking movement, are set in advance in the robot control apparatus. The frames define parameters of angles of the robot's joints, and the like.

In FIG. 1, twelve frames, from P0 to P11, are set. However, the quantity of frames is optional. The frame P0 depicts a posture before walking in which the robot is standing unaided without falling over. The frames P1, P6, and P11 depict postures in which the robot is standing unaided and unmoving without falling over.

For example, in the frame P6, the linear speed of the robot is zero. The robot is standing only on its left leg. The stride length is zero. The conditions of the robot in the frames P1 and P11 are similar. That is, in the frames P1 and P11, the linear speed of the robot is zero, the robot is standing only on its right leg, and the stride length is zero. The stride length being zero means that the robot's two legs are together. As the robot is standing unaided and the stride length is zero in the frames P1, P6, and P11, these frames are called reference frames.

Switching from one frame to another frame is carried out by interpolating the postures of all the intervening frames. Also, each posture in the frames other than the reference frames is loosely defined, and each of these postures is appropriately corrected so that the walk is carried out stably.

Figure 2:
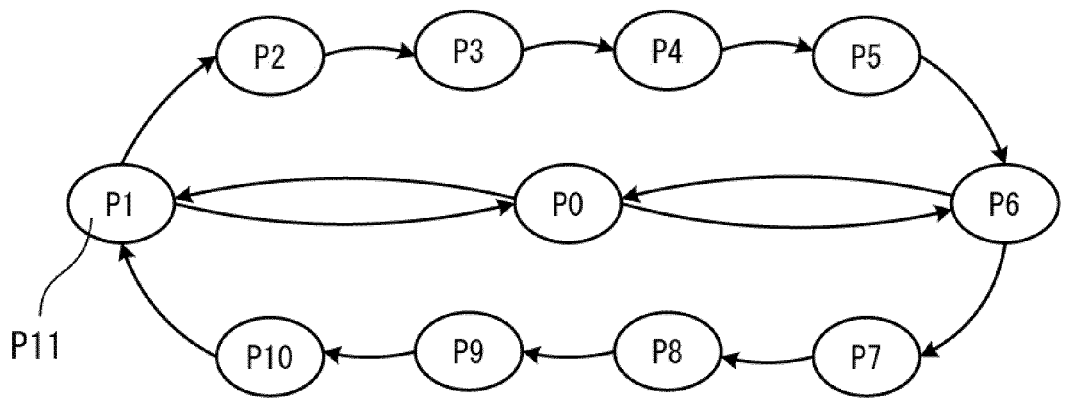
FIG. 2 is a conditional shift diagram of frames P0 to P11.

FIG. 2 is a conditional shift diagram of the frames P0 to P11. The condition of the robot shifts from the frame P0 to the reference frame P1 (similar to the reference frame P11) or the reference frame P6. Also, it is also possible for the condition of the robot to shift from the reference frame P1 or the reference frame P6 to the frame P0. In the example of FIG. 1, firstly, the condition of the robot shifts from the frame P0 to the reference frame P1. Subsequently, the condition of the robot shifts to the reference frame P11, via the frames P2 to P10.

In this way, by acquiring frame information including the reference frames in which the robot is standing unaided without falling over, and interpolating the postures between the frames P0 to P11 so that the movement of the robot attains the postures of the reference frames, the condition of the robot is controlled. As a result, even in the event that the posture of the robot becomes unstable, the posture attains a stable position in the reference frames. That is, the robot can stably continue the walking movement.

Also, as the robot has stopped walking, and is in a condition of standing stably, in the reference frames P6 and P11, it is possible to change the stride length of a subsequent walk, change the walking direction, or start a movement other than walking.

Figure 3:
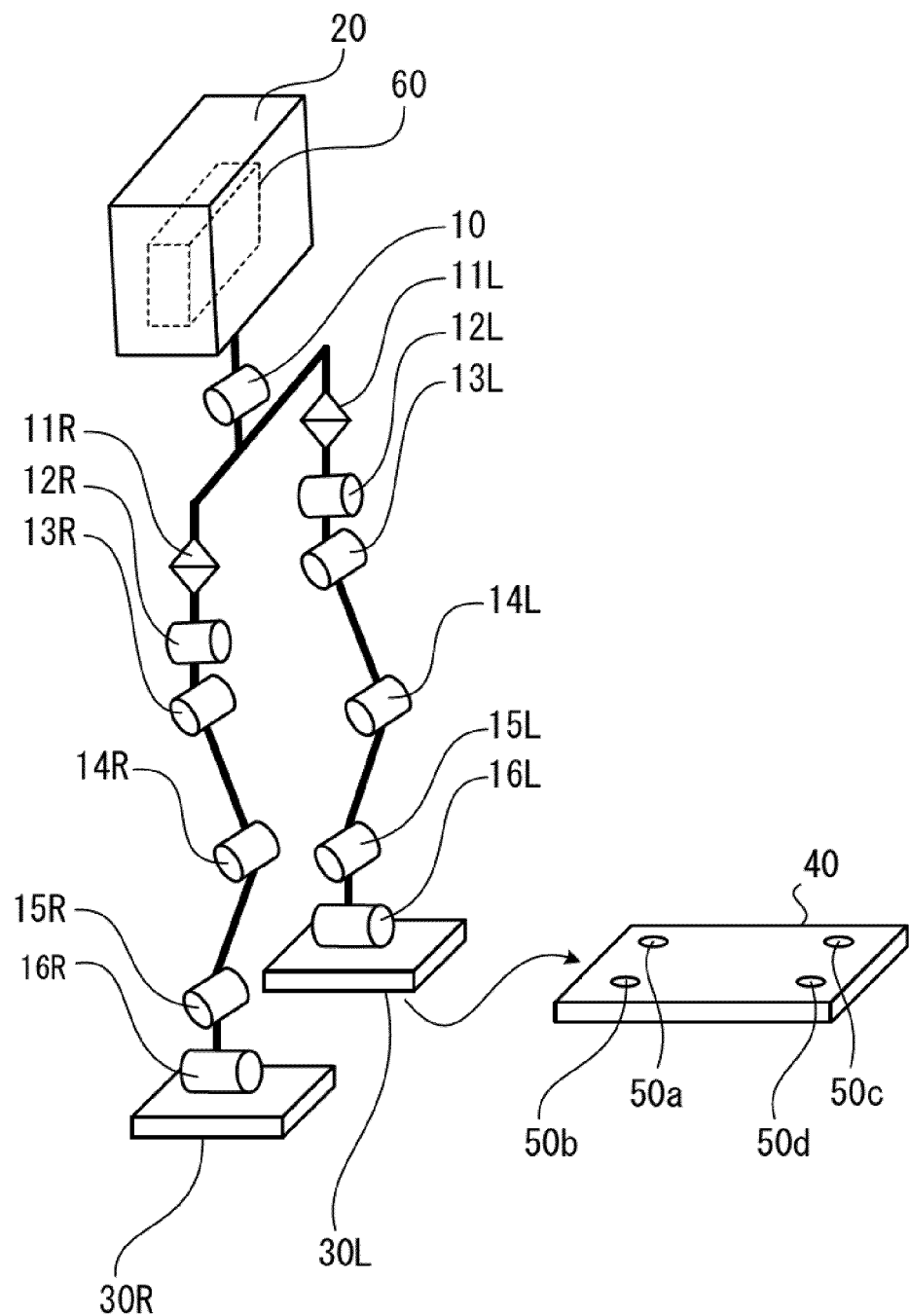
FIG. 3 is a schematic illustration of a robot according to the embodiment.

FIG. 3 is a schematic illustration of the robot according to the embodiment. The robot according to the embodiment includes a torso 20, a gyro sensor 60 installed in the torso, and two legs—a right leg 30R and a left leg 30L. Also, each leg includes six joints. That is, each leg has six degrees of freedom. The quantity of joints is optional.

The joints include a pitch waist joint 10, a right yaw thigh joint 11R, a left yaw thigh joint 11L, a right roll thigh joint 12R, a left roll thigh joint 12L, a right pitch thigh joint 13R, a left pitch thigh joint 13L, a right pitch knee joint 14R, a left pitch knee joint 14L, a right pitch ankle joint 15R, a left pitch ankle joint 15L, a right roll ankle joint 16R, and a left roll ankle joint 16L. A motor (not shown) is embedded in each joint. The motor of each joint controls a movement of the individual joints. Also, a position sensor (not shown) is embedded in each joint. The position sensor of each joint detects the movement, specifically an angle of rotation, of the individual joints.

The pitch waist joint 10 controls an anteroposterior movement (pitching) of the torso 20. The right yaw thigh joint 11R and the left yaw thigh joint 11L allow a side to side rotational movement (yawing) of the robot at each groin portion.

The right roll thigh joint 12R and the left roll thigh joint 12L allow a sideways rotation (rolling) of the robot at each groin portion. The right pitch thigh joint 13R and the left pitch thigh joint 13L allow an anteroposterior rotation (pitching) of the robot at each groin portion.

Also, the right pitch knee joint 14R and the left pitch knee joint 14L allow an anteroposterior movement (pitching) of the robot at each knee portion. The right pitch ankle joint 15R and the left pitch ankle joint 15L allow an anteroposterior movement (pitching) of the robot at each ankle portion. The right roll ankle joint 16R and the left roll ankle joint 16L allow a sideways movement (rolling) of the robot at each ankle portion.

Also, a sole is attached to each leg. In FIG. 3, a sole 40 attached to the left leg 30L is illustrated. Four pressure sensors are embedded in each sole. The quantity of pressure sensors is optional. In FIG. 3, pressure sensors 50a to 50d installed in the sole 40 are illustrated. These pressure sensors measure a reaction force received from the floor by the sole 40. The reaction force measured by the pressure sensors is used in a compliance control and a feedback control of the robot's movement.

The gyro sensor 60 measures an angle of rotation of the torso 20 in the sideways (rolling) direction and the anteroposterior (pitching) direction. The angle of rotation measured by the gyro sensor 60 is used in the feedback control of the robot's movement.

Figure 4:
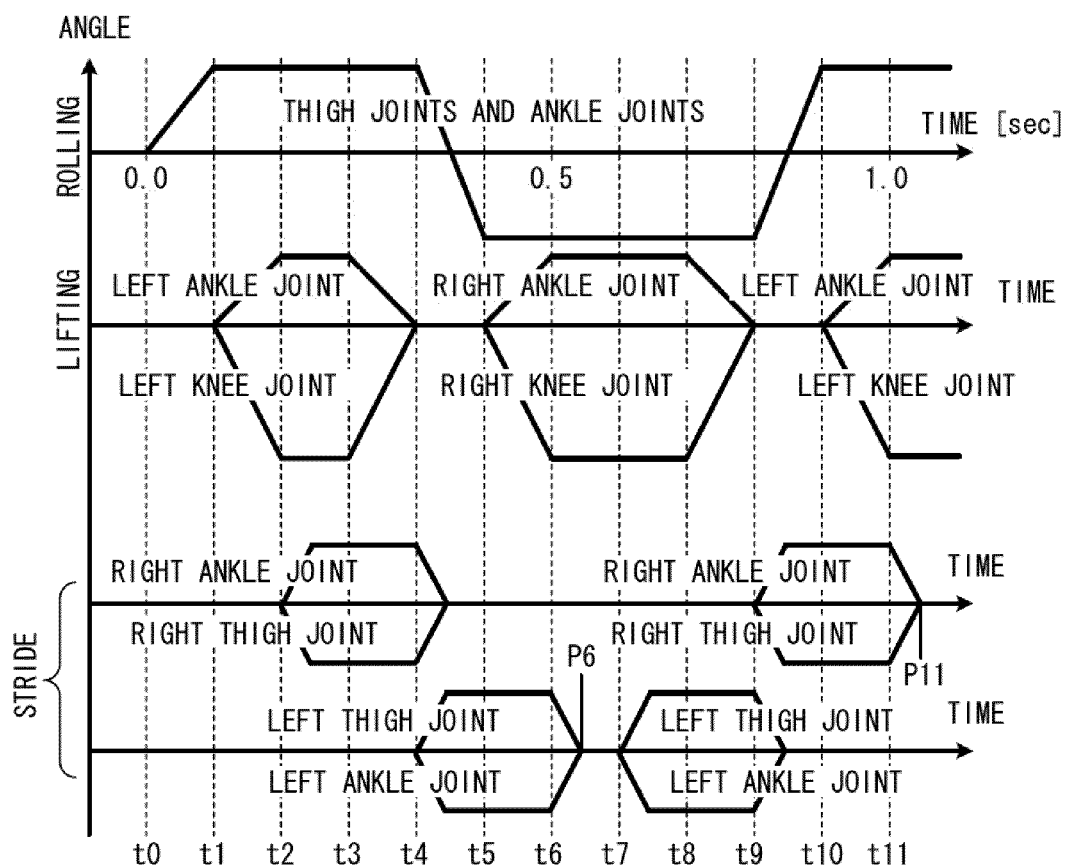
FIG. 4 is a time chart illustrating a walking movement of the robot.

FIG. 4 is a time chart illustrating the walking movement of the robot. At a time t0, the right roll thigh joint 12R, the left roll thigh joint 12L, the right roll ankle joint 16R, and the left roll ankle joint 16L carry out a rolling operation, tilting both legs to the robot's right side, in order to lift the left leg. When carrying out this operation, the movements of the right roll thigh joint 12R, the left roll thigh joint 12L, the right roll ankle joint 16R, and the left roll ankle joint 16L differ slightly, by an amount of a gear backlash compensation.

The amplitude of the rolling operation is decided by trial and error. Alternatively, the amplitude of the rolling operation is decided by carrying out the feedback control in such a way that an assessment function of the rolling angle of the torso 20 is at a minimum.

At a time t1, the right roll thigh joint 12R, the left roll thigh joint 12L, the right roll ankle joint 16R, and the left roll ankle joint 16L stop the rolling operation. Then, in order to lift the left leg, that is, in order to carry out a lifting maneuver of the left leg, the left pitch knee joint 14L rotates in such a way as to retract the left leg, and the left pitch ankle joint 15L rotates in such a way as to retract the left ankle.

At a time t2, the left pitch knee joint 14L and the left pitch ankle joint 15L stop the lifting operation. Then, the right pitch thigh joint 13R and the right pitch ankle joint 15R rotate, carrying out a pitching operation so that the torso 20 moves forward.

Between the time t2 and a time t3, the right pitch thigh joint 13R and the right pitch ankle joint 15R stop the pitching operation.

At the time t3, in order to cause the left leg to land on the floor, the left pitch knee joint 14L rotates in such a way as to extend the left leg, and the left pitch ankle joint 15L rotates in such a way as to extend the left ankle.

At a time t4, the left leg lands on the floor. In addition, the right roll thigh joint 12R, the left roll thigh joint 12L, the right roll ankle joint 16R, and the left roll ankle joint 16L carry out a rolling operation, tilting both legs to the robot's left side, in order to lift the right leg. Furthermore, the right pitch thigh joint 13R and the right pitch ankle joint 15R rotate in such a way as to return to the original condition, that is, the condition at the time t2. Furthermore, in order to start the right leg moving forward, the left pitch thigh joint 13L and the left pitch ankle joint 15L rotate, carrying out a pitching movement so that the torso 20 moves forward.

Between the time t4 and a time t5, as well as the right pitch thigh joint 13R and the right pitch ankle joint 15R returning to the original condition, the left pitch thigh joint 13L and the left pitch ankle joint 15L stop the pitching movement.

Then, at the time t5, the right roll thigh joint 12R, the left roll thigh joint 12L, the right roll ankle joint 16R, and the left roll ankle joint 16L stop the rolling operation. Then, in order to lift the right leg, that is, in order to carry out a lifting maneuver of the right leg, the right pitch knee joint 14R rotates in such a way as to retract the right leg, and the right pitch ankle joint 15R rotates in such a way as to retract the right ankle.

At a time t6, the right pitch knee joint 14R and the right pitch ankle joint 15R stop the lifting operation. Furthermore, the left pitch thigh joint 13L and the left pitch ankle joint 15L rotate in such a way as to return to the original condition, that is, the condition at the time t4. As a result, the posture of the robot is set to the posture defined in the reference frame P6.

Between the time t6 and a time t7, the left pitch thigh joint 13L and the left pitch ankle joint 15L return to the original condition. As a result, the posture of the robot is set to the posture defined in the reference frame P6. That is, the linear speed of the robot is zero, the robot is standing only on its left leg, and the stride length is zero.

At the time t7, in order to start the right leg moving forward, the left pitch thigh joint 13L and the left pitch ankle joint 15L rotate, carrying out a pitching movement so that the torso 20 moves forward.

Between the time t7 and a time t8, the left pitch thigh joint 13L and the left pitch ankle joint 15L stop the pitching operation. At the time t8, in order to cause the right leg to land on the floor, the right pitch knee joint 14R rotates in such a way as to extend the right leg, and the right pitch ankle joint 15R rotates in such a way as to extend the right ankle.

At a time t9, the right leg lands on the floor. In addition, the right roll thigh joint 12R, the left roll thigh joint 12L, the right roll ankle joint 16R, and the left roll ankle joint 16L carry out a rolling operation, tilting both legs to the robot's right side, in order to lift the left leg. Furthermore, in order to start the left leg moving forward, the right pitch thigh joint 13R and the right pitch ankle joint 15R rotate, carrying out a pitching movement so that the torso 20 moves forward. Furthermore, the left pitch thigh joint 13L and the left pitch ankle joint 15L rotate in such a way as to return to the original condition, that is, the condition at the time t7.

At a time t10, the right roll thigh joint 12R, the left roll thigh joint 12L, the right roll ankle joint 16R, and the left roll ankle joint 16L stop the rolling operation. Furthermore, in order to lift the left leg, that is, in order to carry out a lifting maneuver of the left leg, the left pitch knee joint 14L rotates in such a way as to retract the left leg, and the left pitch ankle joint 15L rotates in such a way as to retract the left ankle.

At a time t11, the left pitch knee joint 14L and the left pitch ankle joint 15L stop the lifting operation. Furthermore, the right pitch thigh joint 13R and the right pitch ankle joint 15R rotate in such a way as to return to the original condition, that is, the condition at the time t9. As a result, the posture of the robot is set to the posture defined in the reference frame P11.

Subsequent to the time t11, the right pitch thigh joint 13R and the right pitch ankle joint 15R return to the original condition. As a result, the posture of the robot is set to the posture defined in the reference frame P11. That is, the linear speed of the robot is zero, the robot is standing only on its right leg, and the stride length is zero. By repeating this kind of movement, the walking movement of the robot is realized.

Figure 5:
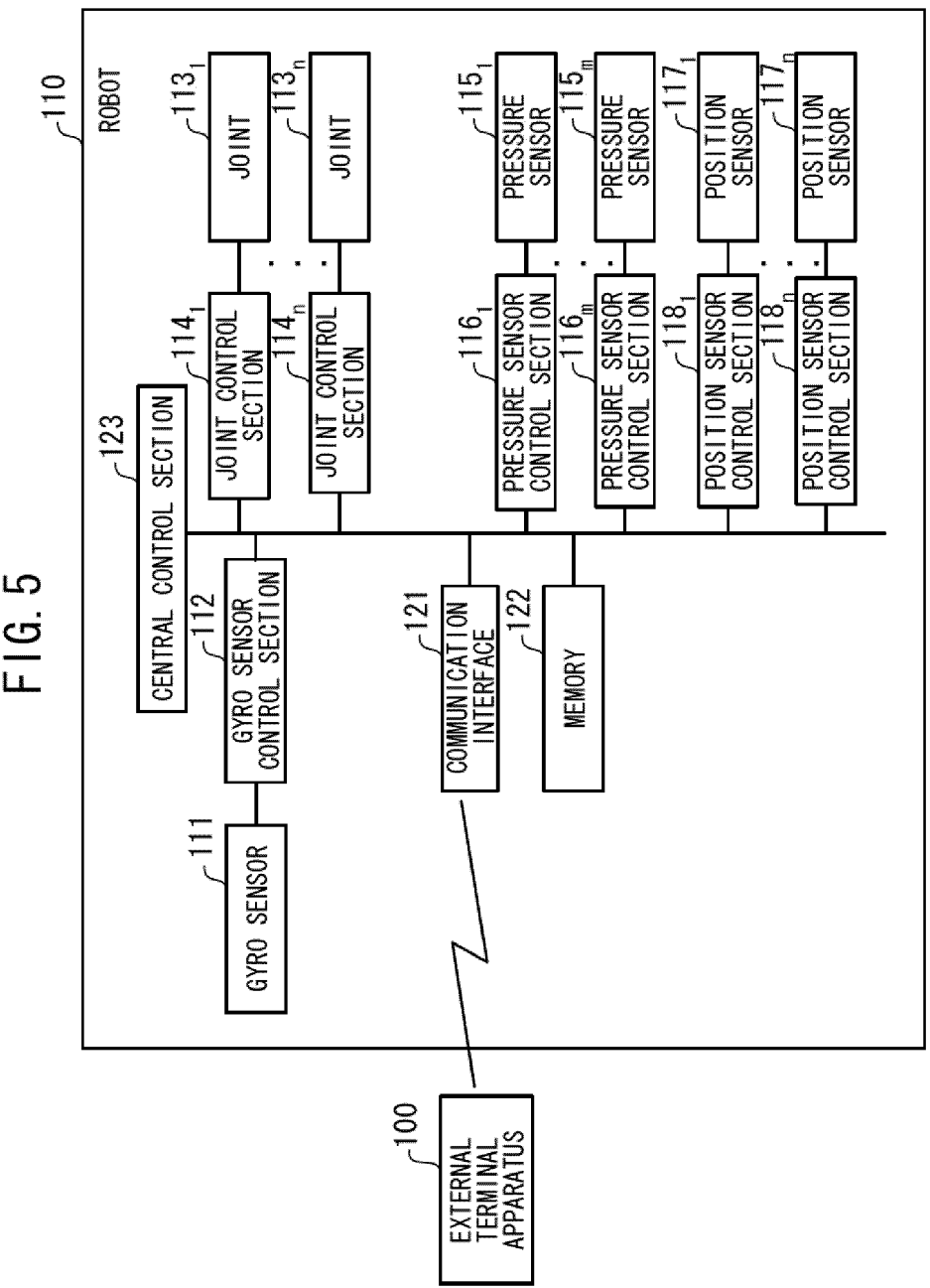
FIG. 5 is a functional block diagram of a robot control system according to the embodiment.

FIG. 5 is a functional block diagram of the robot control system according to the embodiment. The robot control system according to the embodiment includes an external terminal apparatus 100 and a robot 110.

The external terminal apparatus 100 is a personal computer, or the like, operated by an operator who manages the operation of the robot. The external terminal apparatus 100 carries out communication with the robot 110. The communication includes a giving and receiving of various kinds of information.

The external terminal apparatus 100 transmits to the robot 110 preset frame information of the robot 110 and/or information on a command, and the like, to the robot 110, and receives from the robot 110 information relating to a condition (posture, speed, and the like) of the robot 110, and the like. The information obtained from the robot 110 is displayed in a display device (not shown).

The robot 110 is, for example, a two-legged humanoid robot. The robot 110 includes a gyro sensor 111, a gyro sensor control section 112, joints $113_1$ to $113_n$, joint control sections $114_1$ to $114_n$ (n is a positive integer), pressure sensors $115_1$ to $115_m$ (m is a positive integer), pressure sensor control sections $116_1$ to $116_m$, position sensors $117_1$ to $117_n$, position sensor control sections $118_1$ to $118_n$, a communication interface 121, a memory 122, and a central control section 123.

The gyro sensor 111 has the same functions as the gyro sensor 60 illustrated in FIG. 3. The gyro sensor 111, being installed in the torso 20 of the robot 110, measures the angle of rotation of the torso 20 in the sideways (rolling) direction and anteroposterior (pitching) direction. The gyro sensor control section 112, as well as controlling the functions of the gyro sensor 111, transmits information on the angles of rotation measured by the gyro sensor 111 to the central control section 123.

The joints $113_1$ to $113_n$ move various joints of the robot 110. The joint that each motor (not shown) corresponded is driven. The pitch waist joint 10, right yaw thigh joint 11R, left yaw thigh joint 11L, right roll thigh joint 12R, left roll thigh joint 12L, right pitch thigh joint 13R, left pitch thigh joint 13L, right pitch knee joint 14R, left pitch knee joint 14L, right pitch ankle joint 15R, left pitch ankle joint 15L, right roll ankle joint 16R, and left roll ankle joint 16L illustrated in FIG. 3 are included in the joints.

The joint control sections $114_1$ to $114_n$ control the operations of the joints $113_1$ to $113_n$. In particular, the joint control sections $114_1$ to $114_n$ control the joints $113_1$ to $113_n$ so that the joints $113_1$ to $113_n$ rotate at a specific time, at a specific angular speed, and through a specific angle. The angle, angular speed, and time are specified by the central control section 123.

The pressure sensors $115_1$ to $115_m$ are provided in the soles of the right leg and left leg of the robot 110. The pressure sensors $115_1$ to $115_m$ measure the reaction force from the floor. Also, the pressure sensors $115_1$ to $115_m$ have the same functions as the pressure sensors 50a to 50d illustrated in FIG. 3. The pressure sensor control sections $116_1$ to $116_m$ control the functions of the pressure sensors $115_1$ to $115_m$, and transmit information of the reaction force measured by the pressure sensors $115_1$ to $115_m$ to the central control section 123.

The position sensors $117_1$ to $117_n$ are sensors which, being attached to the joints $113_1$ to $113_n$, detect the positions of the joints $113_1$ to $113_n$, and specifically, detect the angles of rotation of the joints $113_1$ to $113_n$. The position sensor control sections $118_1$ to $118_n$, as well as controlling the operations of the position sensors $117_1$ to $117_n$, transmit information on the positions measured by the position sensors $117_1$ to $117_n$ to the central control section 123.

The communication interface 121 carries out communication with the external terminal apparatus 100. The communication interface 121 carries out a wireless communication and/or a wired communication with the external terminal apparatus 100.

The memory 122 stores various items of information. For example, the memory 122, as well as storing information received from the external terminal apparatus 100 and/or information transmitted to the external terminal apparatus 100, stores information relating to results of various kinds of computation performed by the central control section 123.

The central control section 123 carries out an overall control of the robot 110. The central control section 123, for example, based on frame information received from the external terminal apparatus 100, calculates a rotation starting time, the angular speed, the angle of rotation, and the like, of the joints $113_1$ to $113_n$ when the robot 110 operates. Then, the central control section 123 transmits results thereof to the joint control sections $114_1$ to $114_n$.

Also, the central control section 123 receives a robot 110 operation control request from the external terminal apparatus 100 via the communication interface 121. The operation control request includes a stride length change request, a walking direction change request, or a request to execute an operation other than walking.

The central control section 123 executes the heretofore described requests only after the postures of the reference frames P1, P6, and P11 have been realized. When executing the requests, the central control section 123 transmits information on the rotation starting time, angular speed, angle of rotation, and the like, of the joints $113_1$ to $113_n$ corresponding to the requested operation to the joint control sections $114_1$ to $114_n$. As the robot 110 is standing stably on one foot in the reference frames P1, P6, and P11, it is convenient to execute the heretofore described requests when the robot 110 is standing in the postures corresponding to the reference frames P1, P6, and P11.

Herein, although it is taken that the central control section 123 calculates the various parameters, it is also acceptable to employ a configuration such that the external terminal apparatus 100 calculates the various parameters and controls the robot. In the event of employing this kind of configuration, the external terminal apparatus 100 receives the information necessary for calculating the rotation starting time, angular speed, angle of rotation, and the like, from the robot 110, and calculates the parameters based on the information received. The joint control sections $114_1$ to $114_n$ receive information on calculation results from the external terminal apparatus 100, and carry out an operational control of the robot 110 based on the information received.

Figure 6:
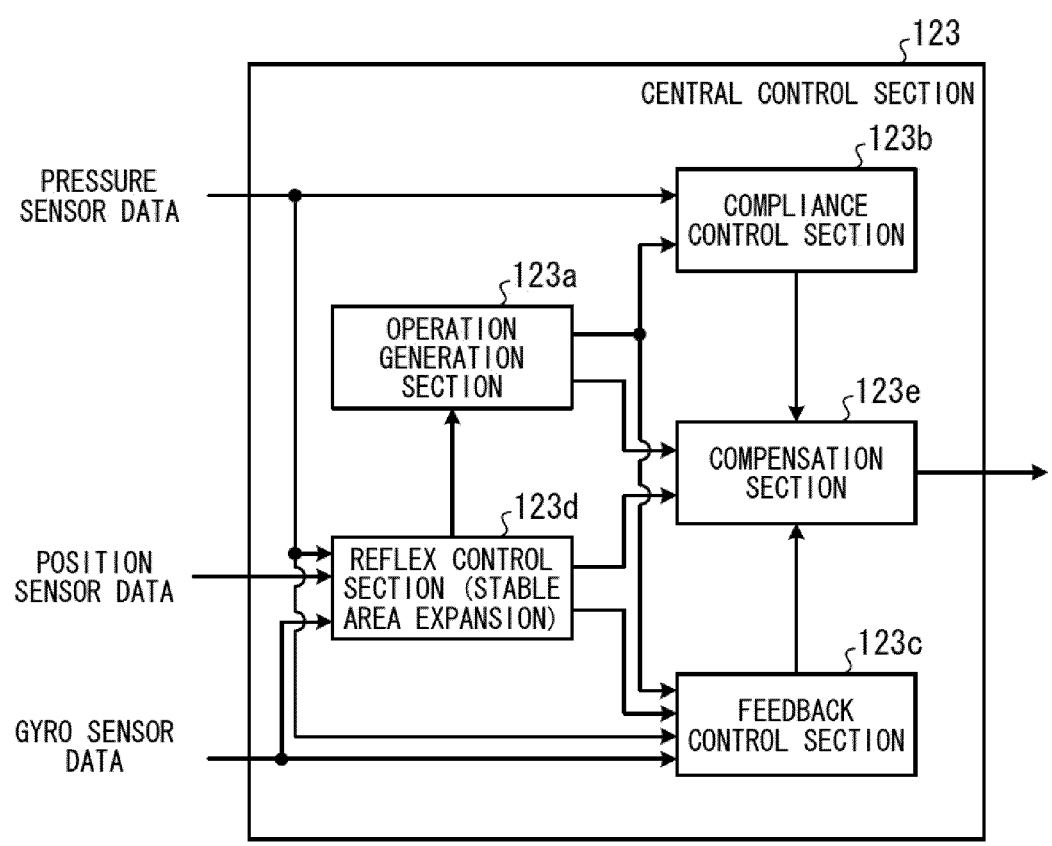
FIG. 6 is a functional block diagram illustrating a configuration of a central control section.

Hereafter, a detailed description will be given of a robot control process carried out by the central control section 123. FIG. 6 is a functional block diagram illustrating a configuration of the central control section 123. As illustrated in FIG. 6, the central control section 123 includes an operation generation section 123a, a compliance control section 123b, a feedback control section 123c, a reflex control section 123d, and a compensation section 123e.

The operation generation section 123a is a processing section which, based on frame information received from the external terminal apparatus 100, calculates the rotation starting time, the angular speed, the angle of rotation, and the like, of the joints $113_1$ to $113_n$ when the robot 110 operates, and outputs the calculated results to the compensation section 123e. Also, the operation generation section 123a passes phase information on which phase, among a rolling phase, a lifting phase, and a landing phase, the robot 110 is in to the compliance control section 123b and feedback control section 123c.

The compliance control section 123b is a processing section which, based on pressure sensor data measured by the pressure sensors $115_1$ to $115_m$, and on phase information from the operation generation section 123a, carries out a compliance control of a landing operation, and the like. The compliance control section 123b calculates an amount of compliance control, and outputs the calculation result to the compensation section 123e.

The feedback control section 123c is a processing section which carries out a gyro feedback control based on gyro sensor data measured by the gyro sensor 111, and a ZMP feedback control based on the pressure sensor data measured by the pressure sensors $115_1$ to $115_m$. The feedback control section 123c calculates an amount of feedback control, and outputs the calculated result to the compensation section 123e.

The reflex control section 123d is a processing section which detects an unforeseen event occurring during a cyclical walking operation, and carries out a reflex control. The reflex control section 123d, using the gyro sensor data measured by the pressure sensors $115_1$ to $115_m$, position sensors $117_1$ to $117_n$, and gyro sensor 111, detects an unforeseen event, such as an obstacle existing on a walking surface. Details of a reflex control with respect to the obstacle existing on the walking surface will be described hereafter.

Figure 7:
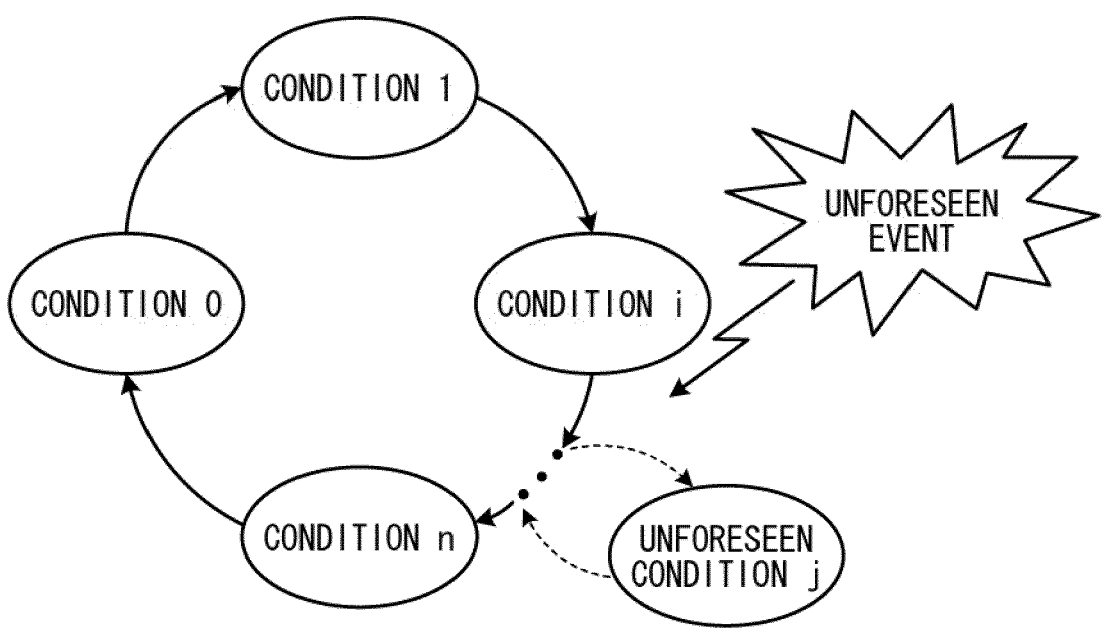
FIG. 7 is an illustration for illustrating a concept of a reflex control by a reflex control section.

FIG. 7 illustrates a concept of a reflex control by the reflex control section 123d. As shown in FIG. 7, the reflex control section 123d, on detecting an unforeseen event when the condition of the robot 110 shifts through the conditions corresponding to each frame, controls the robot in such a way as to temporarily shift to an unforeseen condition j, then return from the unforeseen condition j to the normal condition. At this time, the reflex control section 123d shifts to a kind of unforeseen condition j which keeps an inertial change of the robot 110 to a minimum. By shifting to the kind of unforeseen condition j which keeps the inertial change of the robot 110 to a minimum in this way, it is possible to carry out a stable reflex control.

The compensation section 123e is a processing section which compensates the rotation starting time, angular speed, angle of rotation, and the like, calculated for the joints $113_1$ to $113_n$ by the operation generation section 123a, with the output of the compliance control section 123b, feedback control section 123c, and reflex control section 123d. Then, the compensation section 123e, based on the rotation starting time, angular speed, angle of rotation, and the like, after the compensation, outputs a command to the motors of the joints $113_1$ to $113_n$.

Next, a description will be given of an operational model of the robot 110. The rolling operation of the robot 110 can be approximated by an Equation (1).

$$\varepsilon_i \frac{da(t)}{dt} + a(t) = c(t) \quad (1)$$

Herein, c(t) is an input signal and is expressed as a temporal sequence of a quantity N of piecewise-linear functions $u_i(t)$ ($u_i(t) \in [0,1]$, $t_i \geq 0$, $c_i$ is a real number), as shown in an Equation (2). Also, a(t) is an activation function.

$$c(t) = \sum_{i=1}^{N} c_i u_i(t - t_i) \quad (2)$$

Therein, a walk control of the robot 110 is expressed as follows.

$$\frac{d\theta_i(t)}{dt} = f_i(t, \theta_i) \quad (3)$$

$$f_i(t, \theta_i) = -\frac{1}{\varepsilon}\theta_i(t) + g_i(t) \quad (4)$$

In the equations above, an index i expresses a rolling or a lifting, while $\theta_i$ is a generated movement of a joint. $f_i(t,\theta_i)$ is a piecewise-linear function, continuous with respect to t. $g_i(t)$ is a piecewise-linear function, depicted in the Equation (2), which generates the walk. At an equilibrium point, the robot 110 is controlled by the following PD controller.

$$\begin{cases} \frac{dx_i}{dt} = -a_{ii}x_i + \sum_{j=1, j \neq i}^{N} \frac{a_{ij}}{a_{ii}}x_j + \frac{b_i}{a_{ii}}u_s \\ v(t) = \sum_{i=1}^{N} c_i x_i(t) \end{cases} \quad (5)$$

In the equation above, v(t) is an output of the PD controller to a pitch joint or a roll joint, while $u_s$ is a sensor input. N is an order of the PD controller. Herein, it is taken that N=2. A parameter $a_{ij}$ being greater than 0, values of $a_{ij}$ and $b_i$ may be easily decided since it is not necessary that they are optimum values. Consequently, a command to the motor of the joint is expressed as follows. In the following equation, $h_i(t)$ expresses a reflex operation, while $z_i(t)$ is the command to the motor of the joint.

$$z_i(t) = \theta_i(t) + v(t) + h_i(t) \quad (6)$$

Figure 8:
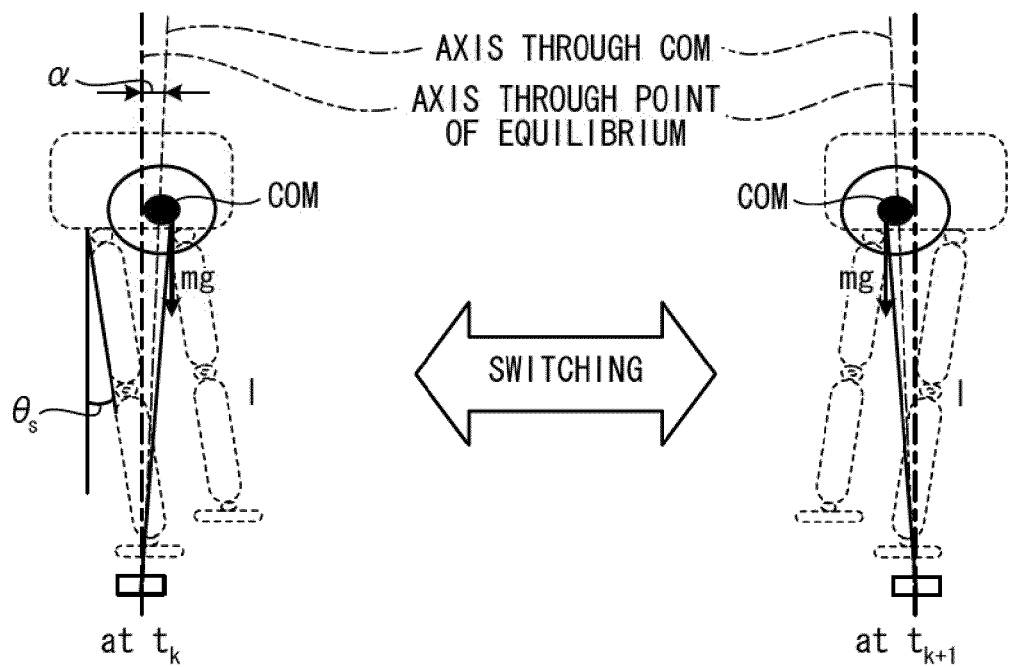
FIG. 8 is a diagram illustrating a shift in a condition of the robot between points of equilibrium defined in a one leg support phase.

The walk of the robot 110 is expressed by the inverted pendulum model depicted in FIG. 8, but it is taken that an inverted pendulum system is expressed in the following way by a two-dimensional open dynamics engine (ODE) which includes a feedback control.

$$\frac{d^2\alpha}{dt^2} + 2\varsigma \frac{d\alpha}{dt} - \mu\alpha = u_g(\alpha) \quad (7)$$

Herein, $\alpha \in R$ is a counter-clockwise angle from a perpendicular of the inverted pendulum. $\varsigma \in R$ is a damping ratio. $\mu = g/l \in R$. $u_g \in R$ is a feedback control input for stabilizing the system. Taking $\theta$ to be an angle of the waist joint, $\theta_r$ to be the angle of the waist joint when a projection of a center of mass (COM) is in a support polygon, and $\alpha = \theta - \theta_r$, an Equation (7) is as follows.

$$\frac{d^2\theta}{dt^2} + 2\varsigma \frac{d\theta}{dt} - \mu\theta = u_g(\theta) \quad (8)$$

Herein, $u_g(\theta)$ is a gyro feedback control signal which stabilizes the inverted pendulum when $\theta$ is in the periphery of $\theta_r$. Then, the system has the following same eigenvalue at each equilibrium point.

$$\lambda_{1,2} = -\varsigma \pm \sqrt{\varsigma^2 + \mu} \quad (9)$$

As $\varsigma \ll \mu$, the equilibrium point of an Equation (9) is a saddle point. In order to generate the cyclical movement depicted in FIG. 8, the equilibrium point is stabilized by a feedback control $u_g(\theta) = k_1\theta + 2k_2 d\theta/dt$, using an angular speed of the inverted pendulum measured by the gyro sensor. The inverted pendulum model being a rough model, there is no need to design an optimum feedback gain, but the feedback gain is determined so as not to cause a violent vibration in the robot 110.

Figure 9:
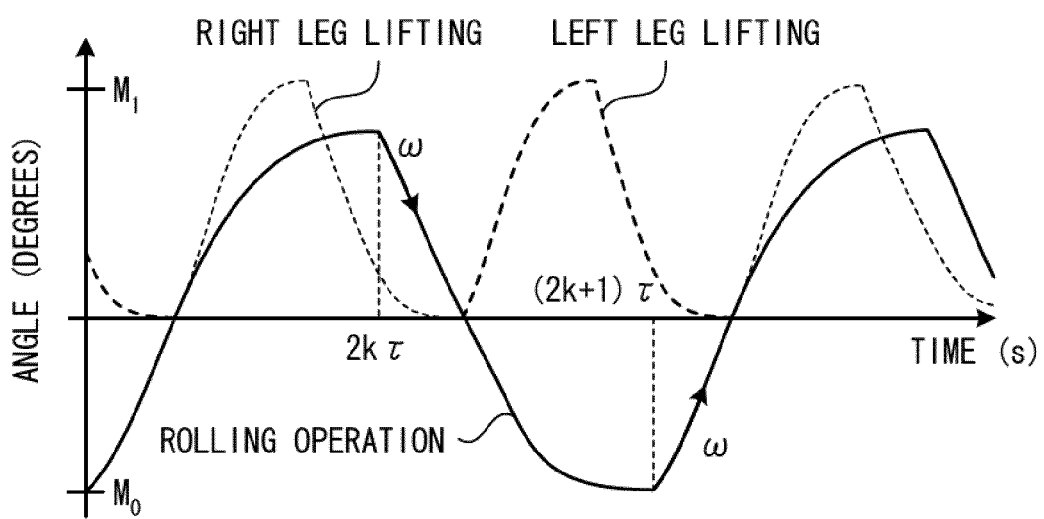
FIG. 9 is a diagram illustrating a rolling command and a lifting command.

A rhythmical movement generated in relation to the rolling operation is approximated by a trapezoid and smoothed using the Equation (1). An angle command to the waist and ankles is depicted in FIG. 9. A control law at a left-right switching time $t = k\tau$ in FIG. 9 is expressed as follows.

$$\begin{cases} \theta(t^-) = (-1)^{k+1}\theta_{max}, \quad d\theta/dt|_{t=t^-} = 0 \\ \theta(t^+) = (-1)^{k+1}\theta_{max}, \quad d\theta/dt|_{t=t^+} = (-1)^k \omega \end{cases} \quad (10)$$

$$k = 1, 2, 3 \ldots$$

Herein, k is a quantity of half walk cycles $\tau$. $t^-$ expresses a time immediately before a commutation point. $t^+$ expresses a time immediately after the commutation point. A trajectory when $t \neq k\tau$ is as depicted in FIG. 9, and a stability at the equilibrium point is guaranteed by the gyro feedback loop depicted in the Equation (6).

The $M_0$ to $M_1$ rolling operation $\theta(t)$ of FIG. 9 is formulated in the way below as the functions time delay $\epsilon$, joint angular speed $\omega$, walk cycle T, and rolling amplitude $a_r$.

$$\theta = f(\epsilon, \omega, T, a_r) \quad (11)$$

Then, using u, which is defined by $u(t_i, \omega_i) = \omega_i(t - t_i)(0 \leq u(t_i, \omega_i) \leq 1$, the cyclical rolling movement is expressed as follows.

$$\varepsilon \frac{d\theta(t)}{dt} + \theta t = a_r \begin{bmatrix} u(t_{r0}, 2\omega_r) - 2u(t_{r0} + (n + f_1)T, \omega_r) + \\ 2u(t_{r0} + (n + f_2)T, \omega_r)) - u(t_f, 2\omega_r) \end{bmatrix} \quad (12)$$

Herein, $t_{r0}$ is a start switching time of the rolling operation. $t_f$ is a completion switching time of the rolling operation. n is a quantity of walking steps. $f_1$ and $f_2$ are times relating to the walking. Taking $p = t_{r1} - t_{r0} - 1/\omega_i$ as a time for which the robot 110 stays in a maximum rolling position, and $t_{r1}$ as a first left-right switching time in a one leg support phase, $f_1$ is $(1/\omega_r + p)/T$, and $f_2$ is $2f_1 + 1/\omega_r T$. The commands to the waist joint and ankle joints are as follows.

$$\theta_{am}{}^r(t) = -\theta_{hm}{}^r(t) = \theta(t) + \theta_{fb}{}^r(t) \quad (13)$$

$\theta_{am}{}^r(t)$: command to ankle joints
$\theta_{hm}{}^r(t)$: command to waist joint
$\theta_{fb}{}^r(t)$: feedback signal stabilizing Equation (7)

Since the command to the waist joint being one in which a code of a command to the ankle joints is inverted, an upper body of the robot 110 is immobile provided that there is no disturbance. That is, the angle speed around a rolling axis when walking is zero.

Figure 10:
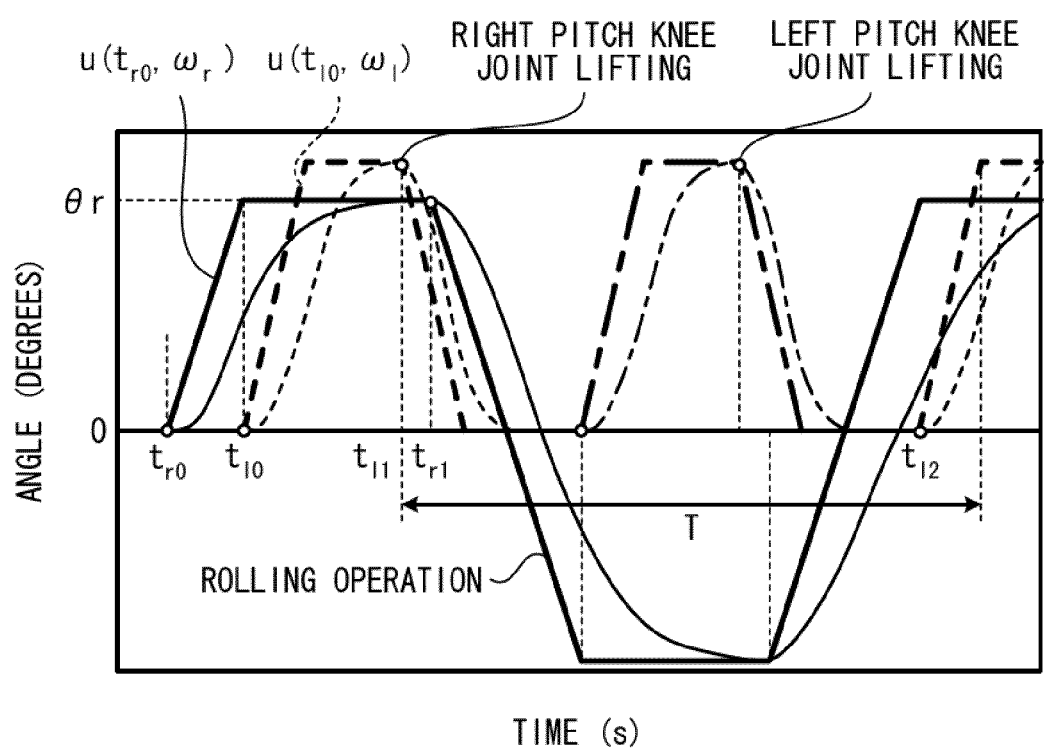
FIG. 10 is diagram illustrating a rolling operation and design parameters.

It being considered that a movement of a swing leg is also the same as the movement of the pendulum, the movement is stable without a compensator. A swing operation is generated in the same way as the rolling operation and is expressed in the following way, based on FIG. 10.

$$\varepsilon \frac{d\theta_1(t)}{dt} + \theta_1(t) = a_1 \begin{bmatrix} u(t_{l0}, \omega_1) - u(t_{l1} + nT, \omega_1) + \\ u(t_{l2} + nT, \omega_1) - u(t_{lf}, \omega_1) \end{bmatrix} \quad (14)$$

Herein, $\theta_l$ is the lifting operation, and $a_l$ is the extent of the lifting. $t_{l0}$ is a switching time of a first lifting. $t_{l2}$ is a switching time of a second lifting. $t_{l1}$ is a switching time of a first landing. $t_{lf}$ is a switching time of a last landing. $\omega_l$ is a joint angular speed which generates the lifting operation.

An angle $\theta_s$, which generates a stride, is expressed as follows.

$$\varepsilon \frac{d\theta_s(t)}{dt} + \theta_s(t) = a_s \begin{bmatrix} u(t_{s1} + nT, \omega_s) - \\ u(t_{s2} + nT, \omega_s) \end{bmatrix} \quad (15)$$

Herein, $a_s$ is the size of the stride. $t_{s1}$ is a time of a start of the stride. $t_{s2}$ is a time of a completion of the stride. $\omega_s$ is a joint angular speed. Also, motor commands relating to the pitching operation are expressed as follows.

$$\begin{cases} \theta_{am}^p(t) = \theta_1(t) + \theta_{fb}^1(t) + \theta_s(t) \\ \theta_{km}(t) = -2\theta_1(t) \\ \theta_{hm}^p(t) = \theta_1(t) + \theta_{fb}^1(t) - \theta_s(t) \end{cases} \quad (16)$$

$\theta_{am}^p$: ankle joint pitching motor command.
$\theta_{km}$: knee joint pitching motor command.
$\theta_{hm}^p$: waist joint pitching motor command.

Figure 11:
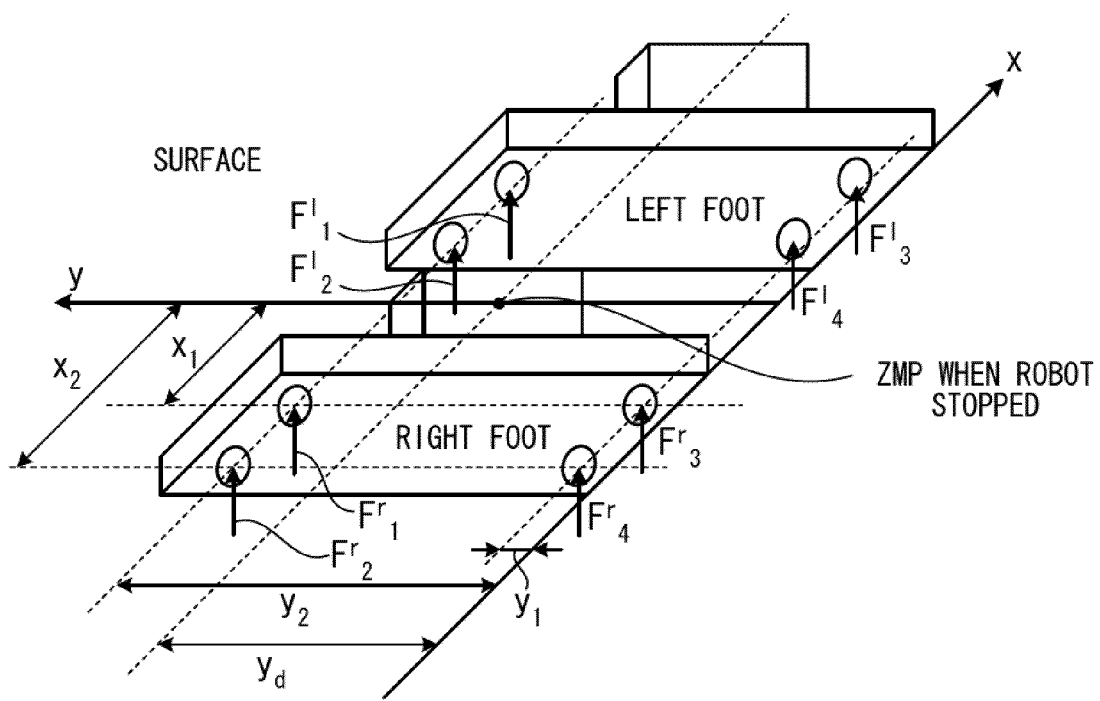
FIG. 11 is a diagram illustrating a pressure working on a sole, and a ZMP.
Figure 12:
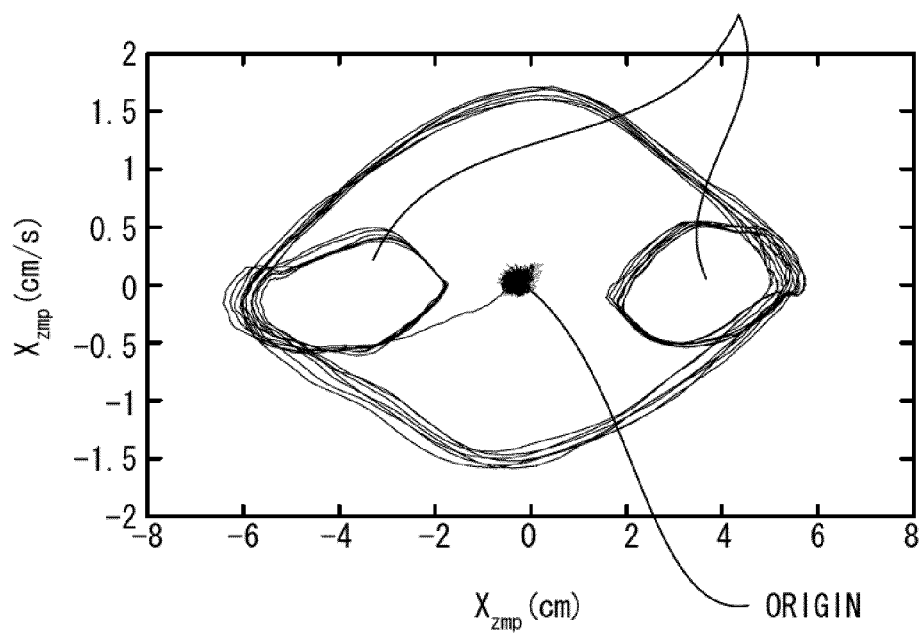
FIG. 12 is a diagram illustrating a trajectory in a state space of a ZMP x element.

A trajectory of the walking operation in a state space of a ZMP x element in the coordinate system in FIG. 11 is depicted in FIG. 12. As depicted in FIG. 12, it can be understood that the walking operation starts from an origin, and cyclically switches between two points of equilibrium. The ZMP x element $x_m$, and a y element $y_m$, are calculated with the following equations using values measured by the pressure sensors in the soles. In the following equations, $F_T$ is a sum of all the pressures working on the soles.

$$x_m = [x_1(F_1^r + F_3^r - F_2^l - F_4^l) + x_2(F_2^r + F_4^r - F_1^l - F_3^l)]/F_T \quad (17)$$

$$y_m = [y_1(F_3^r + F_4^r + F_3^l + F_4^l) + y_2(F_1^r + F_2^r + F_1^l + F_2^l)]/F_T \quad (18)$$

Next, a description will be given of the details of the reflex control by the reflex control section 123d. A basic reflex control with respect to an obstacle existing on the walking surface is as follows.

The obstacle is detected by the pressure sensors in the soles.
The operation of the robot 110 is stopped.
The condition of the robot 110 is shifted to a condition in which the robot may return to an immediately preceding point of equilibrium.
Also, the reflex operation may be expressed as follows.

$$\varepsilon_p \frac{dh_p(t)}{dt} + h_p(t) = u(t - t_{sw})(a_s - \theta_{swp}) \quad (19)$$

$$\varepsilon_r \frac{dh_r(t)}{dt} + h_r(t) = u(t - t_{sw})(\theta_s - \theta_{swr}) \quad (20)$$

Herein, $u(t_i)$ is a unit step function with $t_i$ as a starting point. $h_r(t)$ is a function expressing the rolling operation. $h_p(t)$ is a function expressing the pitching operation. $\varepsilon_r$ and $\varepsilon_p$ are values which are extremely small in comparison to the $\varepsilon$ of the Equation (4). $\theta_{swr}$ is a rolling value when the obstacle is detected. $\theta_{swp}$ is a pitching value when the obstacle is detected. $\theta_s$ is an amplitude of the rolling depicted in FIG. 10.

However, in the event that the obstacle touches an area on a support leg side half of the sole, as illustrated in FIG. 13A, it is not possible to shift the condition of the robot 110 to the condition in which it can return to the immediately preceding point of equilibrium. Also, in the event that the obstacle does not provide a stable surface, it is not possible either for the robot 110 to proceed onto the top of the obstacle.

In the case illustrated in FIG. 13A, due to a dynamic walk pattern of the robot 110, and a delay in a start up of the reflex control, it may happen that the ZMP goes outside the support polygon, in which case it is not possible to prevent the robot 110 from falling over with the reflex operation of Equations (19) and (20).

Therein, in the event that the ZMP goes outside the support polygon, a ZMP support area is enlarged by the rolling operation or pitching operation of the ankle joint of the leg which is in contact with the obstacle. This kind of reflex operation is expressed as follows.

$$\begin{cases} \varepsilon_r \frac{ds_a}{dt} + s_a = s_a(t)u(t_{obs}) + k(u(t_{obs}) - u(t_{cont})) \\ \frac{dx_i}{dt} = -a_{ii}x_i + \sum_{j=1, j\neq i}^{N} \frac{a_{ij}}{a_{ii}}x_j + \frac{b_i}{a_{ii}}e_j(t) \\ r_a(t) = s_a(t) + \sum_{i=1}^{N} c_i x_i \end{cases} \quad (21)$$

Herein, $\varepsilon_r > 0$, and $e_j$ is a distance from the center of the sole to the ZMP. k is an integral constant. $r_a(t)$ is the reflex operation of the pitch ankle joint. $s_a(t)$ is the integral of an angle from a point ($t_{obs}$) at which the obstacle is detected to a point ($t_{cont}$) at which the sole makes contact with the ground and stabilizes. Also, $a_{ij} > 0$, and $a_{ij}$ and $b_i$ are parameters of a PD controller shown in the Equation (5). A rolling start time stable area D illustrated in FIG. 14 depends on a walk stride, and is defined as the point at which the leg makes contact with the ground. In the event that the obstacle makes contact with an area on a half of the sole opposite to the support leg side, as illustrated in FIG. 13B, it is possible to shift the condition of the robot 110 to the condition in which the robot may return to the immediately preceding point of equilibrium.

Next, a description will be given of a process procedure of a reflex control process with respect to an obstacle existing at a swing leg landing point.

Figure 15:
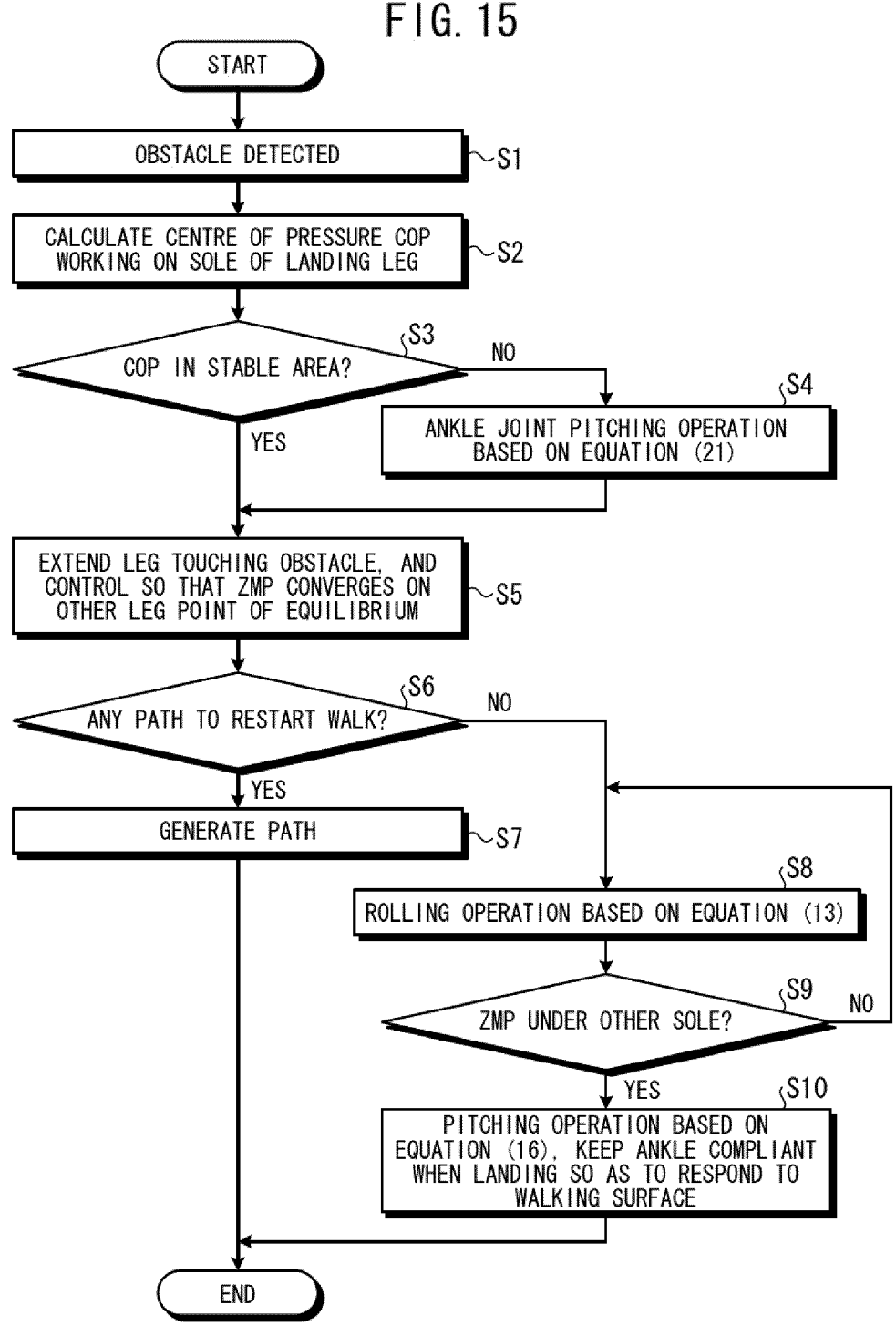
FIG. 15 is a flowchart illustrating a process procedure of a reflex control process with respect to an obstacle existing at a swing leg landing point.

FIG. 15 is a flowchart illustrating the process procedure of the reflex control process with respect to an obstacle existing at the swing leg landing point. As shown in FIG. 15, the reflex control section 123d, upon detecting an obstacle (step S1), calculates a center of pressure (COP) working on the sole of the landing leg (step S2), and determines whether or not the COP is in the stable area (step S3).

If a result is that the COP is not in the stable area, the reflex control section 123d, based on the Equation (21), causes a pitching operation of the ankle joint of the leg in contact with the obstacle (step S4). Then, the reflex control section 123d extends the leg in contact with the obstacle, and controls the leg in such a way that the ZMP converges on the point of equilibrium of the other leg (step S5). Then, the reflex control section 123d determines whether or not there is a path in which to restart the walk (step S6) and, if there is a path, generates the path (step S7).

Meanwhile, if there is no path, the reflex control section 123d carries out a rolling operation based on the Equation (13) (step S8), and determines whether or not the ZMP is under the sole of the other leg (step S9). If a result is that the ZMP is not under the sole of the other leg, the reflex control section 123d returns to step S8 and continues the rolling operation, while if the ZMP is under the sole of the other leg, the reflex control section 123d carries out a pitching operation based on the Equation (16) (step S10). Herein, in order to respond to the walking surface, the ankle is kept compliant when landing (step S10).

In this way, by the reflex control section 123d, based on the Equation (21), causing a pitching operation of the ankle joint of the leg in contact with the obstacle, and expanding the stable area, if the COP is not in the stable area, it is possible to prevent the robot 110 from falling over.

Figure 16:
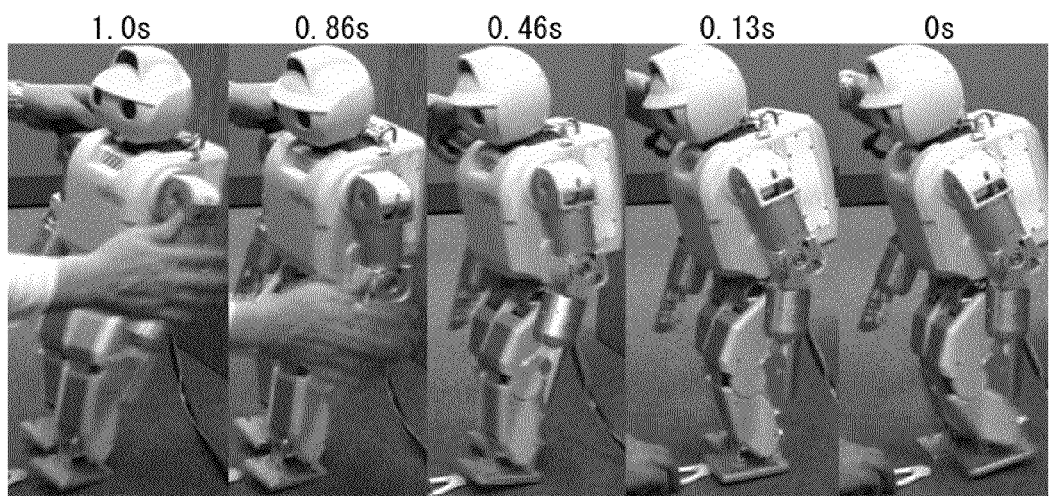
FIG. 16 is a view illustrating an example of a heretofore known reflex control.
Figure 17:
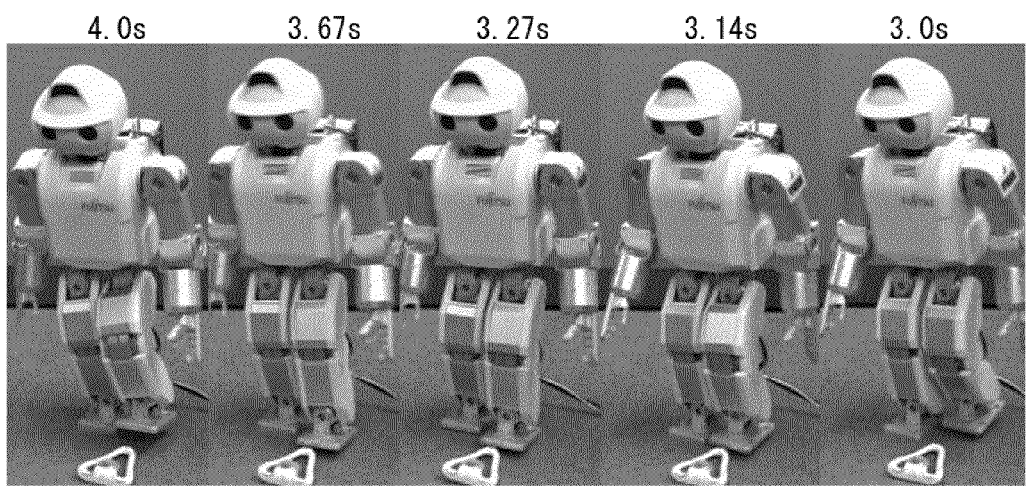
FIG. 17 is a view illustrating an example of the reflex control according to the embodiment.
Figure 18:
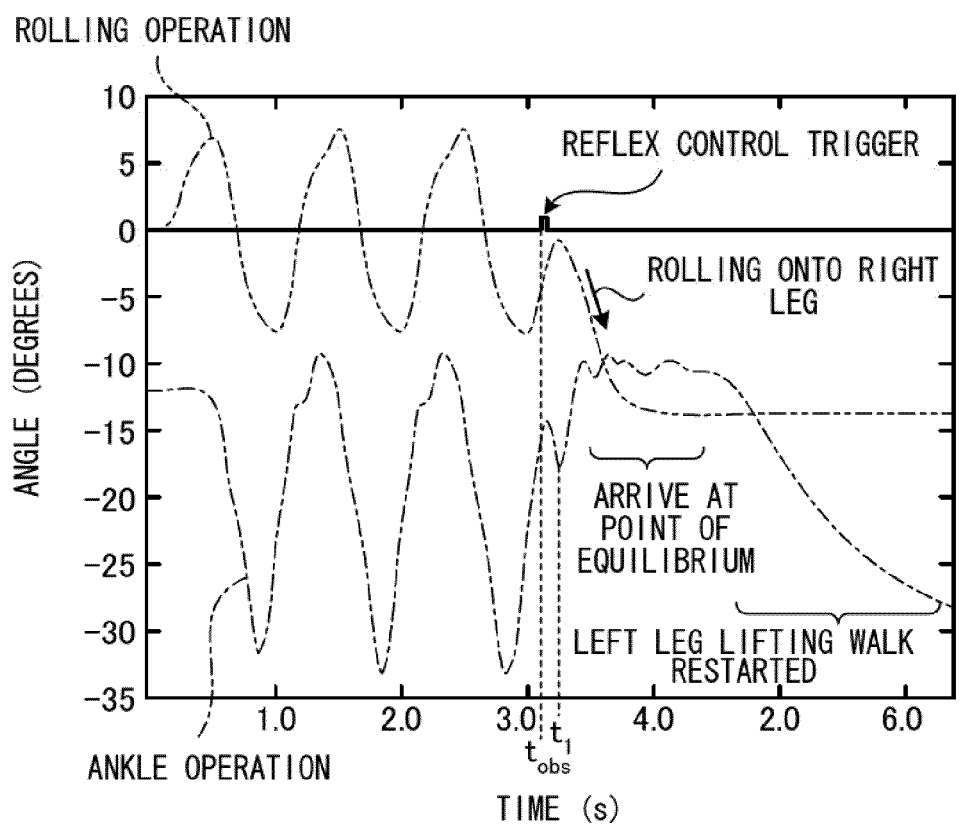
FIG. 18 is a diagram illustrating an operation of an ankle joint.

In the heretofore described case illustrated in FIG. 13A, a difference between the reflex control of the Equations (19) and (20) and the reflex control using the process procedure described in FIG. 15 is described using FIGS. 16 to 18.

FIG. 16 is a view illustrating an example of the reflex control of the Equations (19) and (20) with respect to an obstacle existing at the swing leg landing point.

FIG. 17 is a view illustrating an example of the reflex control using the process procedure shown in FIG. 15 with respect to an obstacle existing at the swing leg landing point. Also, FIG. 18 is a diagram illustrating the ankle joint operation in the reflex control according to the embodiment.

Figure 14:
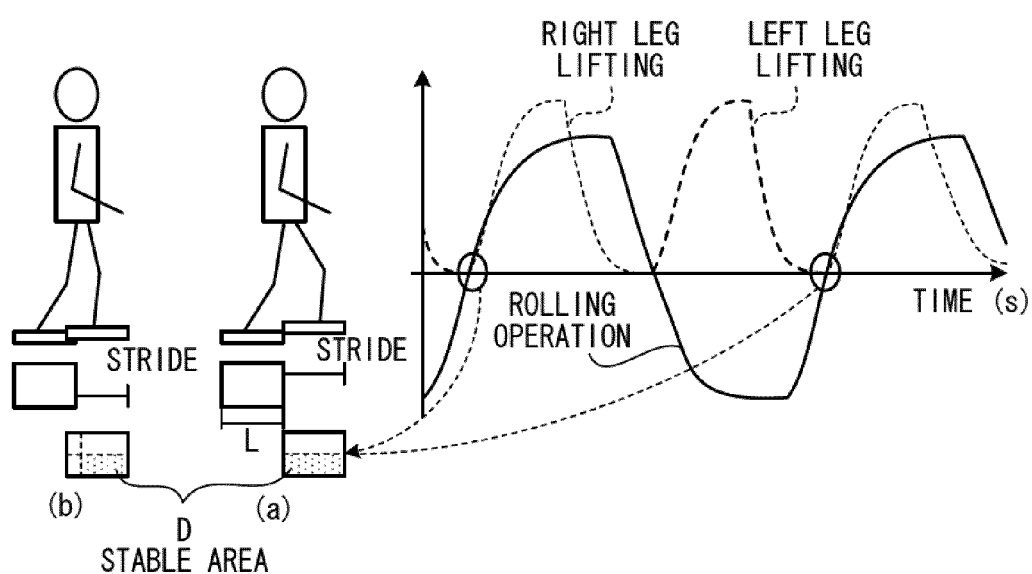
FIG. 14 is a diagram illustrating a stable area at a rolling start time.

As depicted in FIG. 16, with the reflex control in the Equations (19) and (20), unless the place where the obstacle collides with the sole is in the stable area D illustrated in FIG. 14, it is not possible to prevent the robot 110 from falling over. Meanwhile, as depicted in FIGS. 17 and 18, with the reflex control according to the embodiment, the pressure sensors of the left leg detect the obstacle at a 3.14 second point, the ankle pitching joint is controlled at $s_a(t)$ based on the Equation (21), and controlled at $r_a(t)$ at a 3.27 second point, delayed by $1/a_{ij}$. Consequently, it is possible to prevent the robot 110 from falling over.

Figure 19:
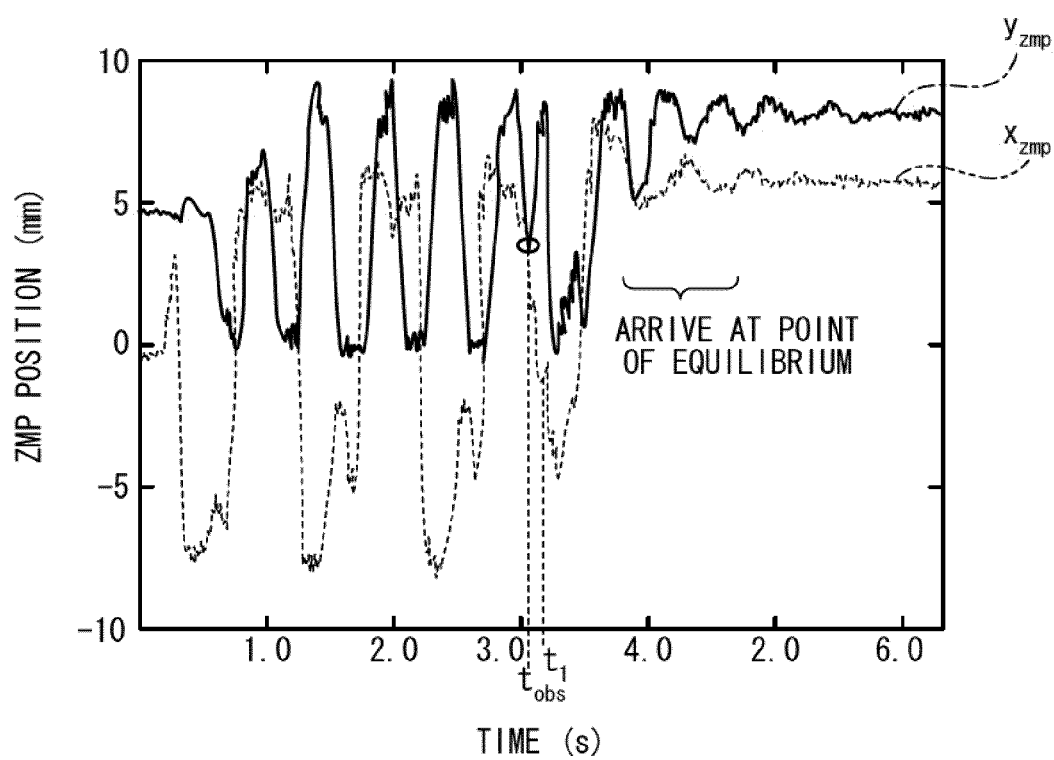
FIG. 19 is a diagram illustrating ZMP positions.

FIG. 19 is a diagram illustrating ZMP positions. Herein, a case is illustrated in which the obstacle is in the position illustrated in FIG. 13A. As illustrated in FIG. 19, the condition of the robot 110 reaches the point of equilibrium in approximately 4.0 seconds.

As heretofore described, in the embodiment, in the event that an obstacle is detected during the walk control of the robot 110, the reflex control section 123d calculates the center of pressure COP working on the sole of the landing leg, and determines whether or not the COP is in the stable area. In the event that the result is that the COP is not in the stable area, the reflex control section 123d, based on the Equation (21), causes a pitching operation of the ankle joint of the leg in contact with the obstacle. Consequently, it is possible to expand the stable area, and it is possible to prevent the robot 110 from falling over.

In the embodiment, a description has been given of a robot control apparatus, but it is possible to obtain a robot control program which includes the same kinds of functions by realizing the configuration of the robot control apparatus with software. Therein, a description will be given of a computer which executes the robot control program.

FIG. 20 is a functional block diagram illustrating a configuration of the computer which executes the robot control program according to the embodiment. As illustrated in FIG. 20, the computer 200 includes an RAM 210, a CPU 220, a flash memory 230, a USB interface 240, and a COM interface 250.

The RAM 210, being a memory which stores a program, a program execution interim result, and the like, corresponds to the memory 122 illustrated in FIG. 5. The CPU 220 is a central processing device which retrieves the program from the RAM 210, and executes the program. The flash memory 230 is a non-volatile memory which stores the program or data, and the USB interface 240 is an interface for connecting the computer 200 to the joints or sensors. The COM interface 250, being an interface for communicating with the external terminal apparatus 100, corresponds to the communication interface 121 illustrated in FIG. 5. Then, the robot control program 231 executed on the computer 200 is retrieved from the flash memory 230, and executed by the CPU 220.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A robot control apparatus, comprising:
    a walking operation control unit which generates control information based on postures at a plurality of differing points, including reference postures in which a robot is standing unaided, and controls the robot so as to carry out a predetermined walking operation;
    an obstacle detection unit which detects an obstacle existing in a place where a leg of the robot lands;
    a determination unit which determines whether or not a place on a sole of the leg of the robot on which a reaction force from the detected obstacle works is in a stable area; and
    a reflex control unit which, when the place where the reaction force works on the sole of the leg of the robot is determined not to be in the stable area, causes an ankle of the leg of the robot in contact with the obstacle to carry out a pitching operation or a rolling operation, expanding the stable area, extends the leg, and controls the leg in such a way that the zero moment point converges on a point of equilibrium of a support leg.

2. A robot control method, comprising:
    generating control information based on postures at a plurality of differing points including reference postures in which a robot is standing unaided, and controlling the robot so as to carry out a predetermined walking operation;
    detecting, via a sensor, an obstacle existing in a place where a leg of the robot lands;

upon the obstacle being detected, determining whether or not a place on a sole of the leg of the robot on which a reaction force from the obstacle works is in a stable area; and in the event that it is determined that the reaction force does not work in the stable area, and after causing an ankle of the leg of the robot in contact with the obstacle to carry out a pitching operation or rolling operation to expand the stable area, extending the leg, and controlling a zero moment point so as to converge on a point of equilibrium of a support leg.

3. A non-transitory computer readable recording medium, having recorded thereon a robot control program, causing a computer to perform a process comprising:

generating control information based on postures at a plurality of differing points including reference postures in which a robot is standing unaided, and controlling the robot so as to carry out a predetermined walking operation;

detecting an obstacle existing in a place where a leg of the robot lands;

upon the obstacle being detected, determining whether or not a place on a sole of the leg of the robot on which a reaction force from the obstacle works is in a stable area; and in the event that it is determined that the reaction force does not work in the stable area, and after causing an ankle of the leg of the robot in contact with the obstacle to carry out a pitching operation or rolling operation to expand the stable area, extending the leg, and controlling a zero moment point to converge on a point of equilibrium of a support leg.

\* \* \* \* \*